United States Patent [19]
Gitlits

[11] Patent Number: 5,859,841
[45] Date of Patent: Jan. 12, 1999

[54] METHOD AND APPARATUS FOR FREQUENCY ALLOCATION IN A CELLULAR TELECOMMUNICATIONS NETWORK

[75] Inventor: Maxim Vladimirovich Gitlits, Clayton, Australia

[73] Assignee: Telstra Corporation Limited, Melbourne, Australia

[21] Appl. No.: 704,550

[22] PCT Filed: Mar. 15, 1995

[86] PCT No.: PCT/AU95/00133

§ 371 Date: Jan. 7, 1997

§ 102(e) Date: Jan. 7, 1997

[87] PCT Pub. No.: WO95/25406

PCT Pub. Date: Sep. 21, 1995

[30] Foreign Application Priority Data

Mar. 15, 1994 [AU] Australia ................................ PM4481

[51] Int. Cl.⁶ .............................. H04B 7/216; H04J 13/06
[52] U.S. Cl. ..................... 370/335; 455/447; 370/337; 375/202
[58] Field of Search ..................... 370/328, 329, 370/330, 335, 336, 337; 375/200, 202; 455/446, 450, 452, 447, 422, 451, 509

[56] References Cited

U.S. PATENT DOCUMENTS

| | | | |
|---|---|---|---|
| 4,128,740 | 12/1978 | Graziano | 455/447 |
| 5,111,534 | 5/1992 | Benner | 455/447 |
| 5,185,739 | 2/1993 | Spear | 370/337 |
| 5,247,699 | 9/1993 | Hartman | . |
| 5,257,398 | 10/1993 | Schaeffer | 455/452 |
| 5,301,188 | 4/1994 | Kotzin et al. | 370/330 |
| 5,365,571 | 11/1994 | Rha et al. | 455/446 |
| 5,402,413 | 3/1995 | Dixon | 370/335 |
| 5,437,054 | 7/1995 | Rappaport et al. | 455/447 |
| 5,570,352 | 10/1996 | Poyhonen | 370/330 |

FOREIGN PATENT DOCUMENTS

| | | |
|---|---|---|
| 0 189 695 A1 | 8/1986 | European Pat. Off. . |
| 0 531 090 A2 | 3/1993 | European Pat. Off. . |
| 0 637 895 A2 | 2/1995 | European Pat. Off. . |
| WO 91/13502 | 9/1991 | WIPO . |
| WO 91/13521 | 9/1991 | WIPO . |
| WO 91/16794 | 10/1991 | WIPO . |
| WO 93/20628 | 10/1993 | WIPO . |
| WO 93/22850 | 11/1993 | WIPO . |
| WO 94/18804 | 8/1994 | WIPO . |

*Primary Examiner*—Hassan Kizou
*Assistant Examiner*—Bob A. Phunkulh
*Attorney, Agent, or Firm*—Thomas J. Engellenner; Lahive & Cockfield, LLP

[57] ABSTRACT

A cellular telecommunications method for use in a cellular telecommunications network (2) having at least one cluster (4) of adjoining cells (6), the cells being allocated different transmission frequencies, the method including swapping the different frequencies amongst the cells (6). A cellular telecommunications network including at least one cluster (4) having adjoining cells (6) with respective base stations (50), the base stations (50) being allocated different transmission frequencies and having control mechanism for controlling swapping of the different frequencies between the base stations (50).

11 Claims, 4 Drawing Sheets

| CELL 1 | | | | | | | | | | | |
|---|---|---|---|---|---|---|---|---|---|---|---|
| | FRAME 1 | | | FRAME 2 | | | FRAME 3 | | | FRAME 4 | | |
| CHANNEL 1 | f1 | f2 | f3 | f4 | f5 | f6 | f7 | f8 | f9 | f1 | f2 | f3 |
| CHANNEL 2 | f2 | f3 | f1 | f5 | f6 | f4 | f8 | f9 | f7 | f2 | f3 | f1 |
| CHANNEL 3 | f3 | f1 | f2 | f6 | f4 | f5 | f9 | f7 | f8 | f3 | f1 | f2 |

| CELL 2 | | | | | | | | | | | |
|---|---|---|---|---|---|---|---|---|---|---|---|
| | FRAME 1 | | | FRAME 2 | | | FRAME 3 | | | FRAME 4 | | |
| CHANNEL 1 | f4 | f5 | f6 | f7 | f8 | f9 | f1 | f2 | f3 | f4 | f5 | f6 |
| CHANNEL 2 | f5 | f6 | f4 | f8 | f9 | f7 | f2 | f3 | f1 | f5 | f6 | f4 |
| CHANNEL 3 | f6 | f4 | f5 | f9 | f7 | f8 | f3 | f1 | f2 | f6 | f4 | f5 |

| CELL 3 | | | | | | | | | | | |
|---|---|---|---|---|---|---|---|---|---|---|---|
| | FRAME 1 | | | FRAME 2 | | | FRAME 3 | | | FRAME 4 | | |
| CHANNEL 1 | f7 | f8 | f9 | f1 | f2 | f3 | f4 | f5 | f6 | f7 | f8 | f9 |
| CHANNEL 2 | f8 | f9 | f7 | f2 | f3 | f1 | f5 | f6 | f4 | f8 | f9 | f7 |
| CHANNEL 3 | f9 | f7 | f8 | f3 | f1 | f2 | f6 | f4 | f5 | f9 | f7 | f8 |

| CELL 1 | |
|---|---|
| CHANNEL 1 | f 1 |
| CHANNEL 2 | f 2 |
| CHANNEL 3 | f 3 |

FIG 3A
(PRIOR ART)

| CELL 2 | |
|---|---|
| CHANNEL 1 | f 4 |
| CHANNEL 2 | f 5 |
| CHANNEL 3 | f 6 |

FIG 3B
(PRIOR ART)

| CELL 3 | |
|---|---|
| CHANNEL 1 | f 7 |
| CHANNEL 2 | f 8 |
| CHANNEL 3 | f 9 |

FIG 3C
(PRIOR ART)

CELL 1

| | FRAME 1 | | | FRAME 2 | | | FRAME 3 | | | FRAME 4 | | |
|---|---|---|---|---|---|---|---|---|---|---|---|---|
| CHANNEL 1 | f1 | f2 | f3 | f1 | f2 | f3 | f1 | f2 | f3 | f1 | f2 | f3 |
| CHANNEL 2 | f2 | f3 | f1 | f2 | f3 | f1 | f2 | f3 | f1 | f2 | f3 | f1 |
| CHANNEL 3 | f3 | f1 | f2 | f3 | f1 | f2 | f3 | f1 | f2 | f3 | f1 | f2 |

FIG 4A
(PRIOR ART)

CELL 2

| | FRAME 1 | | | FRAME 2 | | | FRAME 3 | | | FRAME 4 | | |
|---|---|---|---|---|---|---|---|---|---|---|---|---|
| CHANNEL 1 | f4 | f5 | f6 | f4 | f5 | f6 | f4 | f5 | f6 | f4 | f5 | f6 |
| CHANNEL 2 | f5 | f6 | f4 | f5 | f6 | f4 | f5 | f6 | f4 | f5 | f6 | f4 |
| CHANNEL 3 | f6 | f4 | f5 | f6 | f4 | f5 | f6 | f4 | f5 | f6 | f4 | f5 |

FIG 4B
(PRIOR ART)

CELL 3

| | FRAME 1 | | | FRAME 2 | | | FRAME 3 | | | FRAME 4 | | |
|---|---|---|---|---|---|---|---|---|---|---|---|---|
| CHANNEL 1 | f7 | f8 | f9 | f7 | f8 | f9 | f7 | f8 | f9 | f7 | f8 | f9 |
| CHANNEL 2 | f8 | f9 | f7 | f8 | f9 | f7 | f8 | f9 | f7 | f8 | f9 | f7 |
| CHANNEL 3 | f9 | f7 | f8 | f9 | f7 | f8 | f9 | f7 | f8 | f9 | f7 | f8 |

FIG 4C
(PRIOR ART)

| CELL 1 | | | | | | | | | | | | |
|---|---|---|---|---|---|---|---|---|---|---|---|---|
| | FRAME 1 | | | FRAME 2 | | | FRAME 3 | | | FRAME 4 | | |
| CHANNEL 1 | f1 | f2 | f3 | f4 | f5 | f6 | f7 | f8 | f9 | f1 | f2 | f3 |
| CHANNEL 2 | f2 | f3 | f1 | f5 | f6 | f4 | f8 | f9 | f7 | f2 | f3 | f1 |
| CHANNEL 3 | f3 | f1 | f2 | f6 | f4 | f5 | f9 | f7 | f8 | f3 | f1 | f2 |

FIG 5A

| CELL 2 | | | | | | | | | | | | |
|---|---|---|---|---|---|---|---|---|---|---|---|---|
| | FRAME 1 | | | FRAME 2 | | | FRAME 3 | | | FRAME 4 | | |
| CHANNEL 1 | f4 | f5 | f6 | f7 | f8 | f9 | f1 | f2 | f3 | f4 | f5 | f6 |
| CHANNEL 2 | f5 | f6 | f4 | f8 | f9 | f7 | f2 | f3 | f1 | f5 | f6 | f4 |
| CHANNEL 3 | f6 | f4 | f5 | f9 | f7 | f8 | f3 | f1 | f2 | f6 | f4 | f5 |

FIG 5B

| CELL 3 | | | | | | | | | | | | |
|---|---|---|---|---|---|---|---|---|---|---|---|---|
| | FRAME 1 | | | FRAME 2 | | | FRAME 3 | | | FRAME 4 | | |
| CHANNEL 1 | f7 | f8 | f9 | f1 | f2 | f3 | f4 | f5 | f6 | f7 | f8 | f9 |
| CHANNEL 2 | f8 | f9 | f7 | f2 | f3 | f1 | f5 | f6 | f4 | f8 | f9 | f7 |
| CHANNEL 3 | f9 | f7 | f8 | f3 | f1 | f2 | f6 | f4 | f5 | f9 | f7 | f8 |

FIG 5C

METHOD AND APPARATUS FOR FREQUENCY ALLOCATION IN A CELLULAR TELECOMMUNICATIONS NETWORK

This invention relates to allocation of transmission frequencies in a cellular telecommunications network. In particular, the invention relates to a method and apparatus for dynamically allocating frequencies amongst cells in a cellular network.

An important factor in considering the performance of a cellular telecommunications network relates to the idea of reusing transmission frequencies in separated areas or cells. This cellular concept permits a large subscriber capacity within a limited allocation of a frequency spectrum. For example, only a certain bandwidth within the radio frequency portion of the electromagnetic spectrum is allocated for cellular telecommunications, and each communications carrier requires some fraction of the total available bandwidth. Consequently, only a limited number of carriers can coexist in a single area due to the limited allocation of bandwidth.

An important consideration in cellular communications systems is co-channel interference, which refers to interference between signals from different cells which may be transmitting on the same carrier frequency. Co-channel interference is a function of the distance between the interfering cells and the transmission power and direction of transmission from those cells. Clearly, if every cell in a cellular network were to use all available carrier frequencies then a large amount of co-channel interference would result, particularly between signals from adjacent cells.

In order to alleviate the problem of co-channel interference, a cellular network can be arranged into clusters of adjoining cells, such that the cells in a particular cluster each transmit on different carrier frequencies. Each cell can be allocated a subset of carrier frequencies from the total number of available frequencies. The cells in a single cluster may therefore collectively utilise all of the available frequencies, but since the adjoining cells within the cluster each use different carrier frequencies they do not interfere with each other. Furthermore, taking into account the spatial relationship between adjacent clusters, the allocation of frequencies within a cluster can be arranged so that the frequencies in a cell of one cluster which is adjacent to a cell of another cluster do not interfere.

In addition to co-channel interference, another factor which influences the quality of signal transmission are the propagation conditions for the radio frequency signals. In particular, propagation conditions and phenomena which arise therefrom, such as multipath fading, are dependent upon the transmission frequency, and vary substantially from one carrier frequency to another. A technique known as frequency hopping can be used to reduce the effects of frequency dependent phenomena, by periodically changing the transmission frequency in a particular cell. For example, if a cell has an allocation of three carrier frequencies then the transmitting base station can periodically switch between frequencies during transmission of a particular signal. Therefore, if one of the carriers is subject to poor propagation conditions during transmission of the signal then the signal quality is only affected one third of the time on average. In digital cellular communication systems, frequency hopping facilitates signal processing and diminishes the error probability after error correction decoding. It has been found that the signal quality which can be achieved increases if more frequencies are available for frequency hopping. Unfortunately, the total number of frequencies available in a cluster, and therefore in the network as a whole, is limited and the number of frequencies allocated to a given cell is only a fraction of this amount.

In accordance with the present invention there is provided a cellular telecommunications method for use in a cellular telecommunications network having at least one cluster of adjoining cells, said cells being allocated different transmission frequencies, said method including swapping the different frequencies amongst the cells.

Preferably at any given time each said cell is allocated a set of frequencies which is exclusive to that cell within the cluster. Preferably the sets of frequencies are swapped amongst the cells in a synchronised manner wherein an) particular transmission frequency is available for use by only one cell in a cluster at a time such that the swapping does not influence the co-channel interference.

The inventive method may be used in conjunction with intracell frequency swapping methods in the case where each cell is allocated a set of frequencies. For example, slow frequency hopping may be employed by the cells, which may also be sectored utilising directional antennas. Where an intracell frequency reuse scheme, such as slow frequency hopping, is used, preferably the swapping of frequency sets between cells in the cluster is synchronised with intracell frequency changeover.

In one form of the invention, each cell in the cluster may be allocated a plurality of frequencies to be used for intracell frequency hopping but only a fraction of the frequencies from each cell may be swapped between cells in the cluster, especially if the number of frequencies allocated to cells are different.

Typically only a certain number of transmission frequencies are available for cellular network use, and all of those frequencies can be used by a single cluster and, with the frequency allocation method of the present invention, by every cell within a cluster. Thus a cellular network may comprise a plurality of cells which each periodically utilise the same frequencies while the relative frequencies allocated in adjacent clusters remain unchanged. Where two adjacent cells are from different clusters, the allocation method of the present invention can be structured such that the frequencies allocated to the cells within each cluster do not interfere with the frequencies allocated to adjacent cells in other clusters.

The invention also provides a cellular telecommunications network including at least one cluster having adjoining cells with respective base stations, said base stations being allocated different transmission frequencies and having control means for controlling swapping of the different frequencies between said base stations.

In a preferred form of the invention, each cell within the cluster at any given time has a set of frequencies available for transmission from the base station of that cell. The set of frequencies for each cell are each a subset of the plurality of frequencies available within the cluster, and the transmission frequency from each base station may vary cyclically or randomly amongst the set of frequencies for that cell according to a frequency hopping method. Thus, the controlling means may also control intracell frequency changes as well as intercell frequency changes within the cluster.

The invention further provides a cellular telecommunications method for use in a cellular telecommunications network having at least one cluster of adjoining cells, said cluster being allocated a cluster set of transmission frequencies and said cells having respective different cell sets of frequencies which are subsets of said cluster set, said method including intracell swapping of frequencies in said cell sets and intercell swapping of said cell sets between said cells.

A preferred embodiment of the present invention is hereinafter described, by way of example only, with reference to the accompanying drawings, wherein:

FIG. 1 is a schematic diagram representing a cellular telecommunications network;

FIG. 2 schematically illustrates a cluster of cells from a cellular network;

FIGS. 3A to 3C are tables showing transmission frequency allocation in a conventional cellular network cluster with equal number of frequencies in each cell;

FIGS. 4A to 4C are tables showing transmission frequency allocation in a conventional cellular network employing a cyclic slow frequency hopping strategy; and FIGS. 5A to 5C are tables illustrating a preferred embodiment of a transmission frequency allocation method.

Figure 1:
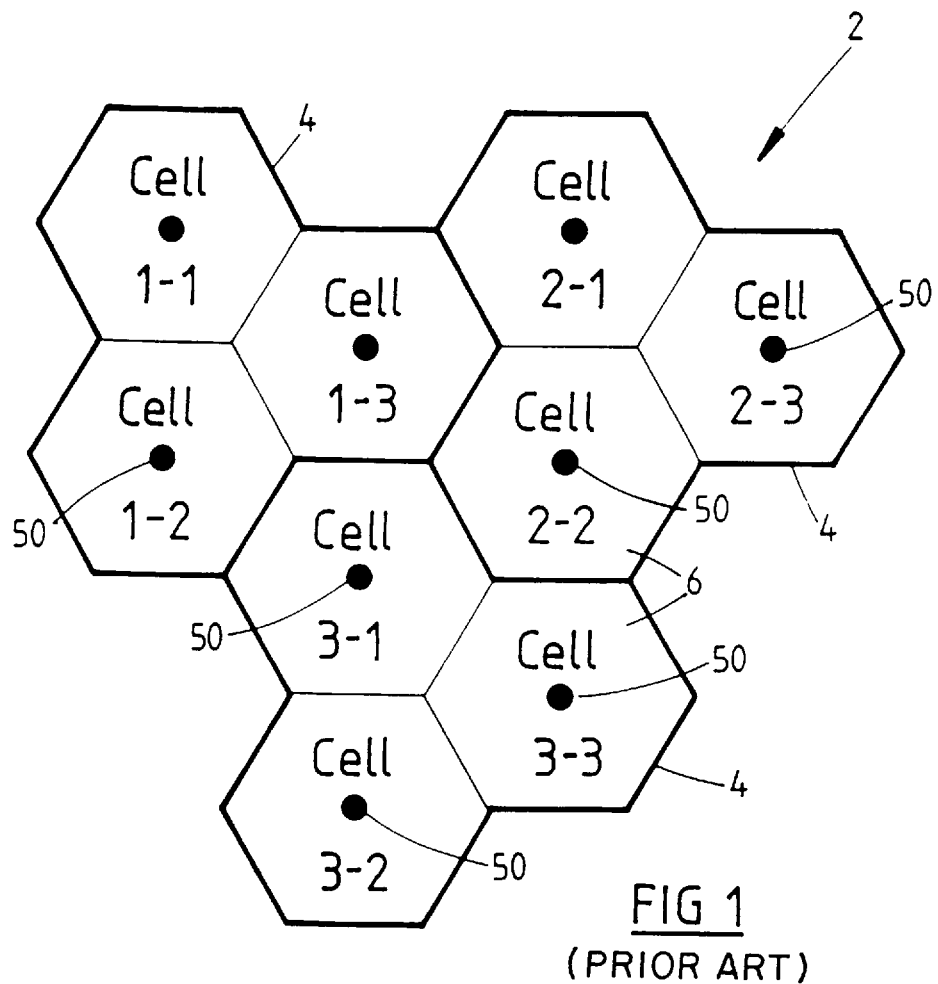

In FIG. 1 there is shown a diagrammatic representation of the geographical layout of a cellular telecommunications network 2 which comprises nine cells 6 organised into three clusters 4 of three cells each. As can be seen from the drawing, each cell is considered to have a regular hexagonal shape, and the three cell clusters 4 each comprise three adjoining cells in a cloverleaf shape.

In the simplest cellular telecommunications network, each cell in the network would be provided with one or more carrier frequencies exclusively for use in that cell. As mentioned above, however, only a limited bandwidth in the electromagnetic spectrum is allocated by regulatory bodies for use in cellular telecommunications. Therefore, to allow for growth, both in terms of geographical area and the number of cells in a network, to cope with increasing communications traffic and to take advantage of the limited transmission power of cellular base stations, frequency reuse strategies are often employed. A frequency reuse strategy involves allocating the same transmission frequencies to a plurality of cells in the network. An important consideration then becomes the minimisation of co-channel interference brought about by transmissions from different cells on the same frequency interfering with each other. The simplest way to reduce co-channel interference is to ensure that the distance between cells using the same carrier frequencies (the "reuse distance") is as large as possible. With this in mind, the idea of reuse clusters can be applied, wherein a cluster comprises a group of adjoining cells in which no two cells in the group are allocated the same carrier frequencies. Thus, with a reuse cluster topography, it is assured that the closest cell utilising the same carrier frequencies is at least as far away as the next cluster. In the early development of analogue cellular systems, cells with omnidirectional base station antennas were deployed, typically in reuse clusters of twelve cells.

It has been found that adverse propagation conditions can seriously degrade communications quality, by virtue of such phenomena as multipath fading. These conditions are frequency dependent, and thus may affect channels transmitted on one carrier frequency but not another. In order to alleviate these difficulties a scheme known as slow frequency hopping can be utilised, particularly in digital transmission systems. In a slow frequency hopping scheme, a particular channel is not assigned to a single carrier frequency, but rather the channel is transmitted using a plurality of different carrier frequencies in sequence. In this way, frequency dependent effects can be averaged out over a number of different carriers such that particular channels are not more seriously affected than others. A base station for a cell and a mobile station which are able to execute frequency hopping is described in International Patent Application No. PLT/AU94/00561.

Figure 2:
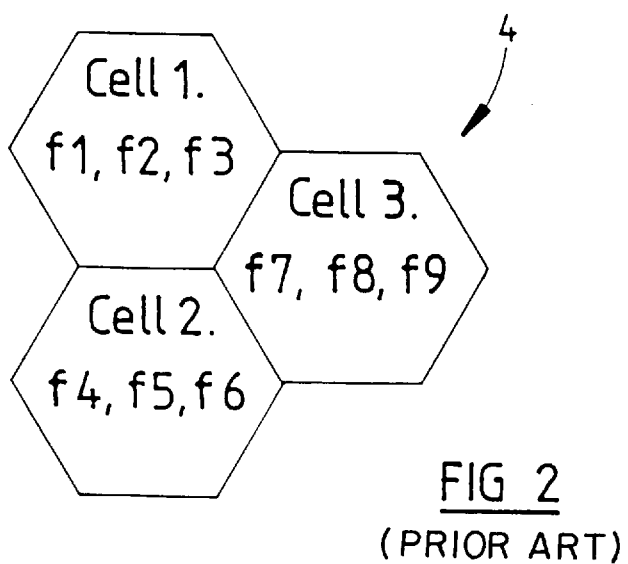

Referring to the network 2 shown in FIG. 1, and the three cell cluster represented in FIG. 2, the above described known cellular transmission techniques can be explained. Consider that the network 2 has available nine different carrier frequencies, $f_1$ to $f_9$. In the simplest case, each of the nine cells 1—1 to 3—3 shown in FIG. 1 would be allocated only one of the available carrier frequencies $f_1$ to $f_9$. This scheme would result in no co-channel interference since each frequency is used only once in the network, but certain cells may experience detrimental multipath fading or other frequency dependent effects, whilst other cells may not. The network 2 is divided into clusters 4 of cells 6, resulting in three clusters of three cells each. The cluster 4 shown in FIG. 2 illustrates one way in which the available frequencies $f_1$ to $f_9$ could be allocated in the cluster, with each cell allocated three separate carrier frequencies. In general, the number of frequencies in each cell may not be equal. Each frequency would then be used by one cell in each cluster, with the frequency allocations within the clusters being arranged so that the cells of neighbouring clusters using the same frequencies are as spatially distant as possible. FIGS. 3A, 3B and 3C are tables of allocation of carrier frequencies to three communications channels in each of the cells 1 to 3 in FIG. 2. As can be seen, each channel is allocated a single transmission frequency for the duration of the channel signal.

However, as mentioned above in a set up such as this undesirable transmission effects may occur to one channel but not others, which effects can be averaged out over the channels and an additional gain in digital cellular communications systems may be achieved by way of slow frequency hopping. Tables 4A, 4B and 4C show a way in which slow frequency hopping could be implemented in the cluster of FIG. 2, wherein each channel is transmitted on each of the carrier frequencies available in that cell, in a sequential manner. For example, channel 1 in cell 1 of the cluster begins transmission on frequency $f_1$, but hops to frequency $f_2$ and subsequently frequency $f_3$ during the course of transmission. The hopping of the frequencies may be carried out cyclically, as shown in Tables 4A to 4C, or may be random. If the sequence is cyclic then the period of the cycle we call a frame. It will be noted that of the three channels shown in each cell, at any one time (column) no two channels are transmitting on the same frequency. Of course this does not take into account time division multiplexing which may be implemented to transmit several channels on a single frequency.

It has been found that the advantages gained by swapping carrier frequencies during transmission thereof are greater if more frequencies are used for each channel. In other words, if each cell has an allocation of six carrier frequencies, the average signal quality obtained over all of the channels in that cell is greater than if only three carrier frequencies are used, as in the above example. Accordingly, implementations of the present invention enable more frequencies to be used in each cell, without decreasing the reuse distance which is important for containment of co-channel interference. In brief, the frequency allocation method of the preferred embodiment provides for intercell frequency swapping as well as, or in place of, intra cell frequency swapping. Thus frequencies can be swapped between cells within a cluster in addition to between channels within a cell. In this way each channel may in fact be transmitted, in sequential portions, using all of the available network carrier frequencies, rather than only a fraction of them depending on the frequency reuse cluster size.

Tables 5A, 5B and 5C show an example of how frequency allocation swapping can be achieved in accordance with the invention, based on the example network described previously. As can be seen with reference to Table 5A, cell 1 of the cluster under consideration is initially allocated frequencies $f_1$, $f_2$ and $f_3$, as in the examples shown in Tables 3A and 4A. Furthermore, as in Table 4A, the three frequencies are swapped between channels during the course of a frame, in a slow frequency hopping scheme. However, at the end of the frame the frequency allocation of cell 1 is swapped with another of the cells in the cluster. In this case frequencies $f_4$, $f_5$ and $f_6$ are swapped from cell 2 to cell 1, frequencies $f_7$, $f_8$ and $f_9$ are allocated to cell 2 and the frequencies $f_1$, $f_2$ and $f_3$ are swapped from cell 1 to cell 3. At the end of the next frame the frequency allocations are again swapped. It can be noticed that the interference conditions do not change in the course of frequency swapping. With frequency allocations swapping with each frame, as in this example, the cyclic period (number of frames) of the frequency allocation swapping method corresponds to the number of cells in the cluster. It will be appreciated, however, that the frequency allocation swapping as between cells within a cluster is quite separate from the slow frequency hopping within a cell, and therefore there is no requirement for frequency allocation swapping to be linked to the frequency hopping frames. Indeed it is possible to implement the preferred embodiment without the provision of intracell frequency swapping as well as vice versa as shown in Tables 4A, 4B and 4C. It will also be appreciated that the frequency allocation swapping method of the preferred embodiment can be used in conjunction with other techniques used in cellular networks such as time division multiplexing of channels on a single carrier, or sectored cells utilising directional antennas to reduce co-channel interference for different number of allocated cell frequencies and different number of frequencies swapped in one time.

The method of the preferred embodiment is executed by base stations 50 of the cells 6, as shown in FIG. 1, which have their controlling hardware and/or software adjusted to facilitate intercell frequency handover as described above. The base stations 50 may be base stations as described in International Patent Application No. PCT/AU94/00561 which is herein incorporated by way of reference.

I claim:

1. A cellular telecommunications method for use in a cellular telecommunications network having at least one cluster of adjoining cells, said cells being allocated different respective sets of different transmission frequencies, said method including:

infracell frequency hopping by swapping the allocated frequencies within said cells; and intercell frequency allocation swapping by swapping said sets of frequencies between the cells.

2. A cellular telecommunications method as claimed in claim 1, wherein said swapping is synchronised so as not to induce co-channel interference in said cells.

3. A cellular telecommunications method as claimed in claim 1, wherein said swapping is periodic.

4. A cellular telecommunications method as claimed in claim 1, wherein a transmission carrier of one said cells periodically uses frequencies allocated to said one of said cells and then swaps said frequencies allocated for frequencies previously allocated to another one of said cells.

5. A cellular telecommunications network including at least one cluster having adjoining cells provided by corresponding base stations, said cells being allocated different respective sets of different transmission frequencies and the base stations having control means for controlling intracell frequency hopping by swapping the allocated frequencies within said cells, and controlling intercell frequency allocation swapping by swapping said sets of frequencies between the cells.

6. A cellular telecommunications network as claimed in claim 5, wherein said control means synchronises said swapping so as not to induce co-channel interference between said cells.

7. A cellular telecommunications network as claimed in claim 5, wherein said swapping is periodic.

8. A cellular telecommunications network as claimed in claim 5, wherein the base stations of said at least one cluster are allocated a cluster set of frequencies, and said base stations are each allocated a respective cell set of frequencies from said cluster set of frequencies, said control means controlling intracell frequency hopping within said cell sets, and intercell swapping of said cell sets periodically between said base stations.

9. A cellular telecommunications network as claimed in claim 5, wherein said network is a TDMA network and said swapping steps are synchronised with the timeslots of TDMA frames.

10. A cellular telecommunications method for use in a cellular telecommunications network having at least one cluster of adjoining cells, said cluster being allocated a cluster set of transmission frequencies and said cells having respective different cell sets of frequencies which are subsets of said cluster set, said method including intracell swapping of frequencies in said cell sets and intercell swapping of said cell sets between said cells.

11. A cellular telecommunications method as claimed in claims 1 or 10, wherein said network is a TDMA network and said swapping steps are synchronised with the timeslots of TDMA frames.

* * * * *